(No Model.)
F. D. BELL.
POTATO CUTTER AND DROPPER.
No. 593,189. Patented Nov. 9, 1897.
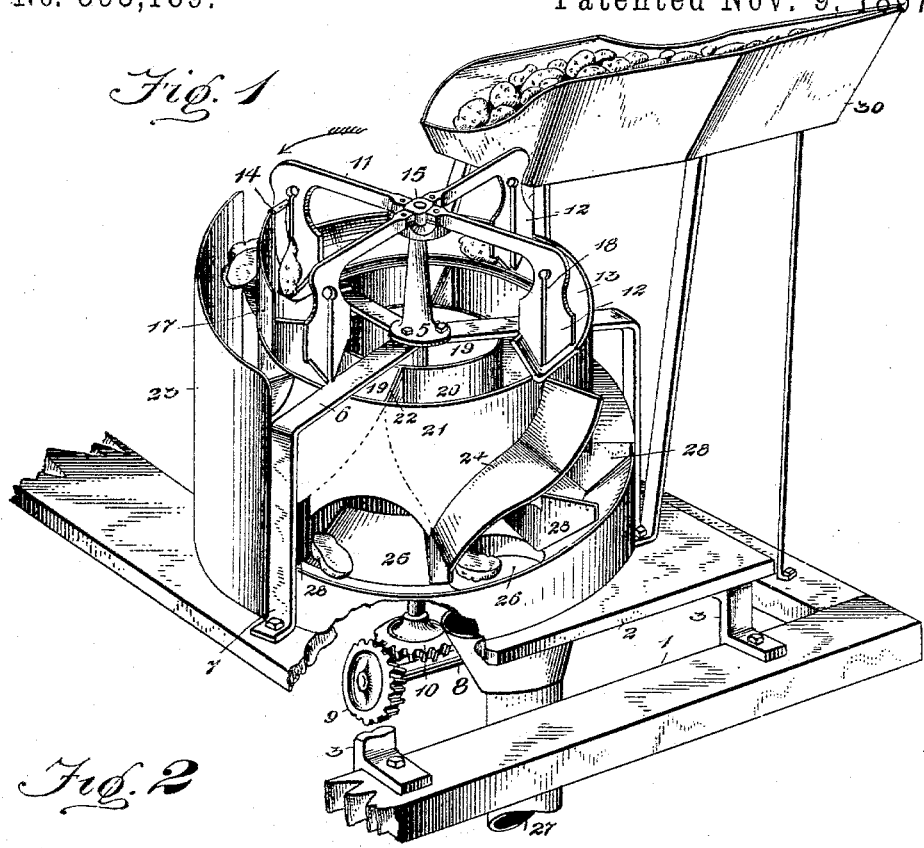
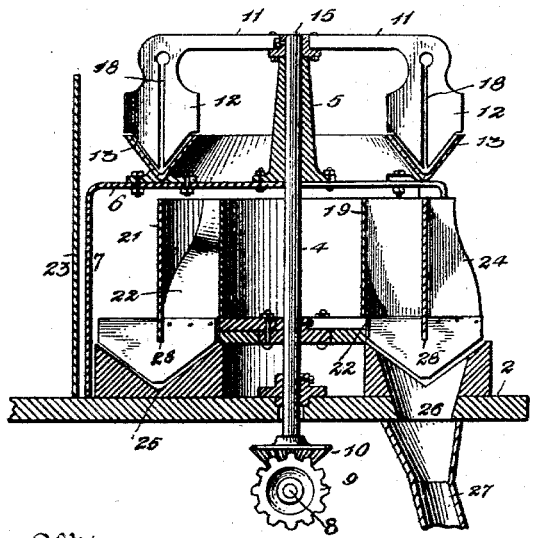
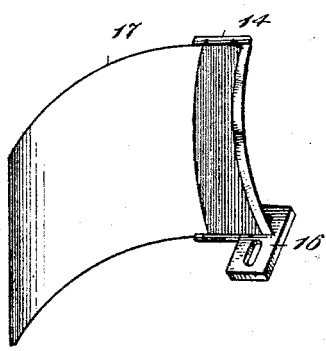
Witnesses
Edmund H. Strause
Alvan D. Brock
Inventor
Frederick D. Bell,
by Fenelon B. Brock,
Attorney
THE NORRIS PETERS CO., PHOTO-LITHO., WASHINGTON, D. C.

UNITED STATES PATENT OFFICE.

FREDERICK D. BELL, OF HORNELLSVILLE, NEW YORK.

POTATO CUTTER AND DROPPER.

SPECIFICATION forming part of Letters Patent No. 593,189, dated November 9, 1897.

Application filed March 3, 1897. Serial No. 625,875. (No model.)

*To all whom it may concern:*

Be it known that I, FREDERICK D. BELL, of Hornellsville, county of Steuben, and State of New York, have invented a new and useful Improvement in Potato Cutters and Droppers; and I do declare the following to be a full, clear, and exact description of the invention, such as will enable others skilled in the art to which it appertains to make and use the same, reference being had to the figures marked on the accompanying drawings, which form a part of this specification.

Figure 1 is a perspective view of my invention with the lower part broken away to show the connection of the driving-gearing. Fig. 2 is a central vertical section of the same. Fig. 3 is a detail perspective view of the cutter and the guide-apron.

The invention consists in the following construction and combination of parts, the details of which will first be fully described, and the features of novelty therein pointed out in the claims.

My invention contemplates a mechanical device for cutting potatoes and dropping the same at regular intervals automatically across the field. The device is adapted for cutting and dropping the cut potatoes at regular intervals of from eighteen inches to three feet apart, although these intervals may be varied to any degree suitable to the requirements of the planter.

In the drawings, 1 represents a portion of any suitable planter to which my device may be adapted. A supplemental frame 2 is generally employed to support the working parts and is rigidly secured to the frame 1 by any suitable means, such as brackets 3.

4 is a vertical shaft which carries the main operating parts of the cutter and dropper and is held in such position by the stationary sleeve 5, rigidly secured, preferably, to a series of radial arms 6, which in the illustration are provided with vertical prolongations 7, bolted to the supplemental frame 2, so as to give a rigid support to the operating parts. The vertical shaft 4 may have other bearings at its lower end for properly supporting the same.

The shaft 4 is rotated by any suitable gear or belt connection driven by the wheeled axle of the planter, which gives motion to the horizontal shaft carried in suitable bearings upon the frame and having a beveled gear 9, which meshes with the beveled gear 10 upon the lower end of shaft 4. Upon the opposite end of shaft 4 are mounted a series of radial arms 11, each carrying at its outer extremity a hand 12, arranged to sweep at regular intervals a segmental trough 13 and carry the potatoes therein to a knife 14, after which they are dropped and delivered by a mechanism hereinafter to be described.

The trough 13 is preferably V-shaped in cross-section, is stationary, and is supported upon the radial arms 6. In the device shown it is semicircular, but it is obvious that the length of this circular trough may be greater or less than a half-circle.

The radial arms 11 are rigidly secured to the shaft 4, preferably by means of a casting 15, having suitable lugs and bolt-holes thereon, by means of which a rigid connection is secured.

The knife 14 is secured to the delivery end of the trough 13 by means of a casting 16, having transverse slots therein, whereby the knife may be adjustably set with relation to the hand 12. Rigidly secured to the rear of the knife 14 is a segmental apron 17.

The hands 12 are vertically slitted at 18 from the bottom upwardly to a sufficient extent to straddle the stationary knife 14 and to pass over the same and over the segmental apron 17. The shape of the hands 12 conforms to that of the trough 13.

Rigidly bolted to the shaft 4 in any suitable manner so as to revolve therewith is an inner cylinder 19, which forms the inner walls of a series of pockets or chutes 20. Concentric therewith is an outer cylinder 21, rigidly secured to the inner cylinder by a series of partitions 22, the inner and outer cylinders and the radial partitions forming the four walls of the inner series of pockets or chutes 20. Exterior to the inner series of chutes is another series of pockets or chutes, the inner walls of which are formed by the outer cylinder 21 and the outer walls by the vertical segmental shield 23 during the rotation of the device past that shield. The walls which form the divisions between the outer series of pockets are the curved or inclined pieces 24, whose upper edges are preferably midway between the division-walls 22 of the inner pockets 20.

At the bottom of the device and vertically beneath the walls or partitions 24 is an annular stationary trough 25, which is provided with a vertical opening 26 at one point communicating with the seed-dropper tube 27, the latter being of the usual construction. The lower ends of the partitions 24 each carry a hand 28, having a configuration conforming to the shape of the annular trough 25. In the drawings this trough is V-shaped.

The bottom of the chutes or pockets 20 preferably converge and terminate in openings through which the cut potatoes deposited therein are directed downwardly into the trough 25.

In the particular device herein shown four revolving hands 12 are employed to feed the potatoes to the knife 14 and four revolving double hands 28 are used to sweep the trough 25 and deliver the cut potatoes to the dropper-tube. There are four inner series of chutes and four outer series of chutes. This machine is designed to feed one-half of a potato to each hill.

In operation the attendant is beside the machine upon the planter and feeds the potatoes from the receptacle 30, carried upon the machine, by placing one potato between every two of the hands 12 in the trough 13 as the hands constantly sweep through the trough. The hands travel in the direction shown by the arrow. They each move a potato along the trough to the end of the same, where the vertical knife 14 is attached, causing the potato to be cut in substantially equal parts, the pieces dropping into the chutes and the hand straddling the knife and the apron 17. The half of the potato on the inner side of the knife drops into one of the inner chutes 20 and, striking against the inclined bottom thereof, is carried downwardly into the annular trough 25 between two of the hands 28. At the same moment the other half of the potato on the outer side of the knife drops into the complementary outer chute and, falling upon the curved or inclined partition 24, is carried downwardly and rearwardly into the trough 25 to the rear of the first half of the potato just described to be swept along the trough by the next succeeding hand 28.

By the terms "rear" and "rearwardly" will be understood as in the direction contrary to the rotary direction indicated by the arrow in Fig. 1.

As a result but one piece or half of one potato is deposited and moved along by one of the hands 28 and deposited in the dropper-tube 27 to be planted.

Should it be desired to cut the seed-potatoes into smaller portions, a modification of the hand 12 and knife 14 will be necessary. Should it be found desirable to deliver more than one piece of a potato in each hill, the number of the hands 12 could be increased, say to eight, when all the rotating pockets would each receive a piece of potato, and then there would be two pieces of potato in the trough 25 between each adjacent pair of hands 28.

The apron 17 serves to insure the dropping of the cut piece of potato into its appropriate chute, and the shield 23 also serves to insure the outer piece of potato being carried into the trough below. The shield 23 may extend entirely around the device, but this is not essential.

Instead of the stationary shield an outer rotating cylinder rigidly secured to the outer edges of the partitions 24 might be employed.

Having thus described my invention, what I claim as new, and desire to secure by Letters Patent of the United States, is—

1. The combination of a dropper, a circular trough discharging into the dropper, and a series of hands rotatably mounted and adapted to sweep the trough.

2. The combination of a circular trough having a discharge-opening therein, a radially-arranged series of rotating chutes or pockets, and a series of hands secured to the divisions between the series of chutes, adapted to sweep the trough.

3. The combination of the circular trough having a discharge-opening therein, a radially-arranged series of chutes or pockets, the division-walls of which extend downwardly and are inclined rearwardly, and a series of hands secured to the division-walls, adapted to sweep the trough.

4. The combination of a circular trough having a discharge-opening therein, an inner and an outer series of rotating chutes or pockets, disposed above the trough, both the inner and outer series of pockets discharging into said trough, and means for sweeping the trough.

5. The combination of a circular trough, an inner and outer series of pockets rotatingly mounted and disposed above the trough, the inner series of pockets discharging vertically and outwardly into the trough, and the outer series of pockets discharging vertically and rearwardly into the trough, and means for sweeping the trough.

6. The combination of a segmental feed-trough, a series of rotating hands adapted to sweep said trough, and means for discharging or dropping the potato or other seed fed into said trough.

7. The combination of a feed-trough, a series of hands adapted to traverse said trough, and a knife located at the discharge end of the trough.

8. The combination of a segmental trough, a series of rotative arms adapted to traverse said trough, a vertical knife secured to the discharge end of the trough, and a vertical apron secured to the rear edge of the knife.

9. The combination of a feed-trough, a series of hands adapted to traverse said trough, a vertical knife secured to the discharge end of the trough, each of the hands being vertically slitted to straddle or pass over the knife.

10. The combination of a segmental trough, a series of rotative arms adapted to sweep said trough, a series of chutes rotatively mounted below said segmental trough, a circular trough disposed below the chutes, and having a discharge-opening, and a series of hands moving with the chutes, and adapted to sweep the circular trough.

11. The combination of a segmental trough, a stationary knife, a series of rotative arms adapted to sweep said trough, a series of chutes or pockets below the segmental trough, a circular trough having a discharge-opening, a series of hands adapted to sweep the circular trough, the hands of the feed-trough, the hands of the circular trough and the series of chutes all being mounted for rotation in unison.

In testimony whereof I affix my signature in the presence of two witnesses.

FREDERICK D. BELL.

Witnesses:
S. HARRISON,
GEORGE DYER.